United States Patent
Amulothu et al.

(10) Patent No.: US 10,084,676 B2
(45) Date of Patent: Sep. 25, 2018

(54) AUDITING NETWORKING DEVICES

(71) Applicant: International Business Machines Corporation, Armonk, NY (US)

(72) Inventors: Venkata Siva N. Amulothu, Plano, TX (US); Ashish Kapur, Santa Clara, CA (US); Vishal Shukla, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 14/828,832

(22) Filed: Aug. 18, 2015

(65) Prior Publication Data

US 2017/0054623 A1 Feb. 23, 2017

(51) Int. Cl.
H04L 12/26 (2006.01)
H04L 12/721 (2013.01)
H04L 29/12 (2006.01)

(52) U.S. Cl.
CPC .............. *H04L 43/10* (2013.01); *H04L 45/26* (2013.01); *H04L 61/6022* (2013.01)

(58) Field of Classification Search
None
See application file for complete search history.

(56) References Cited

U.S. PATENT DOCUMENTS

| | | | | |
|---|---|---|---|---|
| 6,101,528 A * | 8/2000 | Butt | ........................ | H04L 29/06 709/203 |
| 7,650,376 B1 * | 1/2010 | Blumenau | ........... | H04L 67/1008 709/203 |
| 7,809,711 B2 * | 10/2010 | Alba | ................... | G06F 17/3071 707/709 |
| 8,014,370 B2 * | 9/2011 | Banerjea | ................ | H04L 45/26 370/229 |
| 8,634,297 B2 * | 1/2014 | Mishra | ............... | H04L 43/0811 370/235 |
| 8,797,876 B2 | 8/2014 | Gantenbein et al. | | |
| 8,934,376 B2 | 1/2015 | Sivaramakrishna Iyer et al. | | |
| 2002/0161596 A1 * | 10/2002 | Johnson | ................. | G06Q 10/10 705/1.1 |
| 2003/0204619 A1 * | 10/2003 | Bays | ................... | H04L 12/2697 709/238 |
| 2004/0218542 A1 * | 11/2004 | Lee | ........................ | H04L 12/24 370/248 |

(Continued)

*Primary Examiner* — Bunjob Jaroenchonwanit
(74) *Attorney, Agent, or Firm* — Christopher K. McLane; David M. Quinn (57) ABSTRACT

Auditing networking devices is provided. A first traceroute is initiated from a first computing device to a second computing device. The first traceroute identifies at least one networking device along a data path from the first computing device to the second computing device. The first computing device is caused to send a first resource discovery packet to the second computing device. The first resource discovery packet includes a value matching a reserved multicast MAC address. Information describing one or more networking devices is compiled. The information is based, at least in part, on replies generated by one or more networking devices that received a resource discovery packet. One or more networking devices described by the information from the data path is excluded responsive to receiving a request.

17 Claims, 7 Drawing Sheets

(56) References Cited

U.S. PATENT DOCUMENTS

| | | | | |
|---|---|---|---|---|
| 2005/0207410 A1* | 9/2005 | Adhikari | H04L 12/4633 | 370/389 |
| 2006/0191007 A1* | 8/2006 | Thielamay | G06F 21/577 | 726/22 |
| 2007/0153763 A1* | 7/2007 | Rampolla | H04L 41/0806 | 370/351 |
| 2007/0274227 A1* | 11/2007 | Rauscher | H04L 12/2697 | 370/252 |
| 2007/0282799 A1* | 12/2007 | Alba | G06F 17/3071 | |
| 2008/0063002 A1* | 3/2008 | Zheng | H04W 84/10 | 370/401 |
| 2008/0080507 A1* | 4/2008 | Swallow | H04L 43/50 | 370/392 |
| 2009/0019531 A1* | 1/2009 | Rosenberger | H04L 12/2602 | 726/4 |
| 2009/0031286 A1* | 1/2009 | Yee | G06Q 10/10 | 717/120 |
| 2010/0146324 A1* | 6/2010 | Sajassi | H04L 12/2852 | 714/2 |
| 2011/0106787 A1* | 5/2011 | Waters | G06F 17/30867 | 707/709 |
| 2012/0102543 A1* | 4/2012 | Kohli | H04L 63/20 | 726/1 |
| 2012/0113817 A1* | 5/2012 | Fitzgerald | H04L 43/10 | 370/248 |
| 2013/0021648 A1* | 1/2013 | Scaff | H04L 43/0817 | 358/1.15 |
| 2013/0148489 A1* | 6/2013 | Boutros | H04L 43/0811 | 370/216 |
| 2013/0176900 A1* | 7/2013 | Jogadhenu | H04L 12/2809 | 370/255 |
| 2013/0215790 A1* | 8/2013 | Jones | H04L 12/2859 | 370/254 |
| 2013/0286895 A1* | 10/2013 | Mittapalli | H04L 69/324 | 370/255 |
| 2014/0029446 A1* | 1/2014 | Loher | H04M 3/2236 | 370/249 |
| 2014/0126419 A1* | 5/2014 | Boland | H04W 8/005 | 370/254 |
| 2014/0229615 A1* | 8/2014 | Hsueh | H04L 67/2842 | 709/224 |
| 2014/0313940 A1* | 10/2014 | Finn | H04L 12/2416 | 370/255 |
| 2014/0351435 A1* | 11/2014 | Abraham | H04L 67/16 | 709/225 |
| 2015/0003422 A1* | 1/2015 | Jin | H04W 74/06 | 370/335 |
| 2015/0055658 A1* | 2/2015 | Abidi | H04L 12/465 | 370/401 |
| 2015/0169850 A1* | 6/2015 | Chen | G06F 21/105 | 726/26 |
| 2015/0256448 A1* | 9/2015 | Xiao | H04L 45/26 | 370/235 |
| 2015/0281102 A1* | 10/2015 | Lee | H04L 47/115 | 370/236 |
| 2015/0373688 A1* | 12/2015 | Samuel Raj | H04L 63/108 | 370/329 |
| 2015/0381565 A1* | 12/2015 | Thaler | H04L 61/2046 | 370/389 |
| 2016/0026448 A1* | 1/2016 | Gocek | G06F 9/44505 | 717/174 |
| 2016/0212553 A1* | 7/2016 | Tran | H04R 25/70 | |
| 2016/0254956 A1* | 9/2016 | Xu | H04L 41/0809 | 370/255 |
| 2016/0269245 A1* | 9/2016 | Barnes | H04L 41/12 | |
| 2017/0048788 A1* | 2/2017 | Chen | H04L 29/08 | |

* cited by examiner

RESOURCE DISCOVERY PACKET STRUCTURE

| DESTINATION MAC ADDRESS | SOURCE MAC ADDRESS | ETHERTYPE | TYPE OF PACKET | UNDERLAY HOP INFORMATION TLV | TARGET MAC ADDRESS | NEXT HOP'S MAC ADDRESS | RESOURCE INFORMATION TLV |
|---|---|---|---|---|---|---|---|
| | | | | | | | |

FIG. 6

RESOURCE DISCOVERY TABLE STRUCTURE

| ENDPOINT IP ADDRESS | TYPE OF NETWORKING DEVICE | IP ADDRESS OF NETWORKING DEVICE | SERIAL NUMBER OF NETWORKING DEVICE | MAKE AND MODEL OF NETWORKING DEVICE | SOFTWARE NAMES AND VERSIONS | FEATURES SUPPORTED | LICENSED FEATURES |
|---|---|---|---|---|---|---|---|
| | | | | | | | |

AUDITING NETWORKING DEVICES

TECHNICAL FIELD

The present invention relates generally to the field of networked computing and, more particularly, to auditing networking devices.

BACKGROUND OF THE INVENTION

As data storage needs increase and cloud computing becomes more prevalent, there is more focus on the reliability and resources used to manage and route information traffic flow. Customers demand that information is transmitted to and from the cloud with the same level of data security and control over routing paths as privately managed data centers provide.

SUMMARY

According to one embodiment of the present disclosure, a method is provided. The method includes initiating, by one or more processors, a first traceroute from a first computing device to a second computing device, wherein the first traceroute identifies at least one networking device along a data path from the first computing device to the second computing device; causing, by one or more processors, the first computing device to send a first resource discovery packet to the second computing device, wherein the first resource discovery packet includes a value matching a reserved multicast media access control (MAC) address; compiling, by one or more processors, information describing one or more networking devices based, at least in part, on replies generated by one or more networking devices that received a resource discovery packet; and responsive to receiving a request, excluding, by one or more processors, one or more networking devices described by the information from the data path.

According to another embodiment of the present disclosure, a computer program product is provided. The computer program product comprises a computer readable storage medium and program instructions stored on the computer readable storage medium. The program instructions include program instructions to initiate a first traceroute from a first computing device to a second computing device, wherein the first traceroute identifies at least one networking device along a data path from the first computing device to the second computing device; program instructions to cause the first computing device to send a first resource discovery packet to the second computing device, wherein the first resource discovery packet includes a value matching a reserved multicast MAC address; program instructions to compile information describing one or more networking devices based, at least in part, on replies generated by one or more networking devices that received a resource discovery packet; and program instructions to, responsive to receiving a request, exclude one or more networking devices described by the information from the data path.

According to another embodiment of the present disclosure, a computer system is provided. The computer system includes one or more computer processors, one or more computer readable storage media, and program instructions stored on the computer readable storage media for execution by at least one of the one or more processors. The program instructions include program instructions to initiate a first traceroute from a first computing device to a second computing device, wherein the first traceroute identifies at least one networking device along a data path from the first computing device to the second computing device; program instructions to cause the first computing device to send a first resource discovery packet to the second computing device, wherein the first resource discovery packet includes a value matching a reserved multicast MAC address; program instructions to compile information describing one or more networking devices based, at least in part, on replies generated by one or more networking devices that received a resource discovery packet; and program instructions to, responsive to receiving a request, exclude one or more networking devices described by the information from the data path.

DETAILED DESCRIPTION

Embodiments of the present invention recognize that, when utilizing cloud computing resources, there can be uncertainty involved in identifying what path traffic will take from one point to another point. However, the path does not identify details of all networking devices through which data is transmitted from one point to another point within a network.

Embodiments of the present invention provide for auditing networking devices. Once hardware and software details about servers and networking devices used to transmit a customer's data are identified, customers can choose whether any of the network resources must be avoided when routing the customer's data.

According to some embodiments, the task of identifying networking devices (e.g., switches, routers) between two endpoints (e.g., network servers or other computing devices) in a network can include running a traceroute from a first endpoint to a second endpoint, although the traceroute alone may be insufficient to identify certain networking devices (e.g., a switch). As used herein, a switch is a layer 2 networking device. A traceroute identifies each router along a path between two points within a network and the amount of time it took for information to get from one computing device to the next computing device. A packet is a piece of information that travels along the path through the network from a source to a destination. A hop is the path between a first device and the next device along a path through the network. Each computing device in the network is identified by its internet protocol (IP) address, which may be a four- to twelve-digit number separated by periods that identifies the computing device on the network. If there is an interruption in the transfer of a packet, the traceroute may indicate where along the path the problem occurred. The one or more networking devices identified by a traceroute may be referred as a set of networking devices. The set of networking devices identified by a traceroute from a first server to a second server may include the same or different networking devices relative to a set of networking devices identified by a traceroute from the second server to the first server.

Generally, a traceroute compiles a list of the nodes along a path through a network. Embodiments of the present invention provide for gathering detailed defining data about each networking device along a path between two endpoints within a network in order to provide more control over traffic paths along which data travels.

Embodiments of the present invention will now be described in detail with reference to the Figures.

Figure 1:
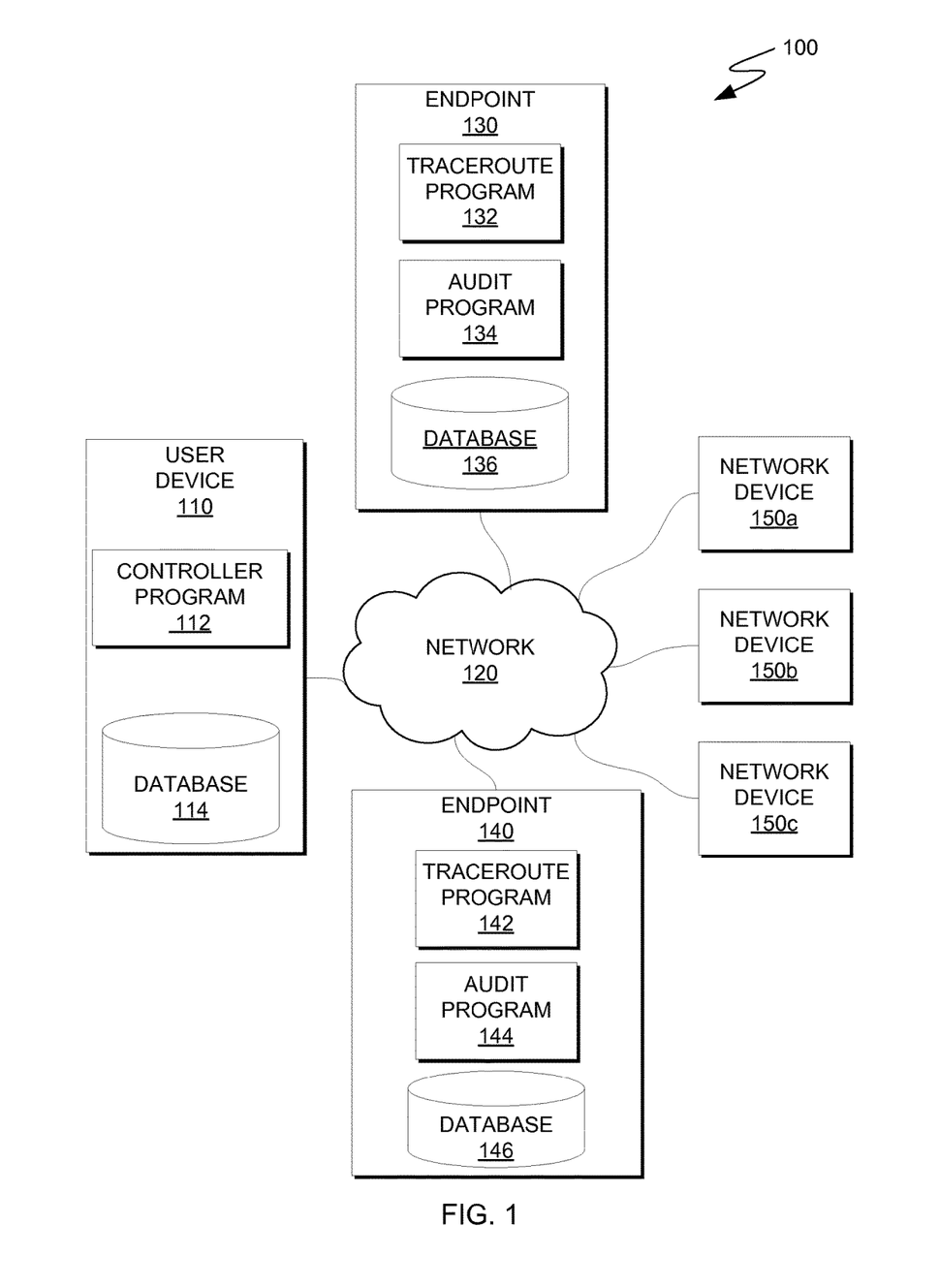
FIG. 1 is a functional block diagram of a computing environment, in accordance with an embodiment of the present disclosure.

FIG. 1 is a functional block diagram illustrating a computing environment, in accordance with an embodiment of the present invention. For example, FIG. 1 is a functional block diagram illustrating computing environment 100. Computing environment 100 includes user device 110, endpoint 130, endpoint 140, networking device 150a, networking device 150b, and networking device 150c, all connected via network 120. Networking devices 150a, 150b, and 150c are sometimes collectively referred to as networking device(s) 150. Networking device(s) 150 may include a greater or lesser number of networking devices than depicted in FIG. 1. User device 110 includes controller program 112 and database 114. Endpoint 130 includes traceroute program 132, audit program 134, and database 136. Endpoint 140 includes traceroute program 142, audit program 144, and database 146.

Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between endpoint 130, user device 110, endpoint 140, and networking device(s) 150, in accordance with a desired embodiment of the present invention.

In various embodiments, each of endpoint 130 and endpoint 140 can be a computing device that can be a standalone device, a wearable computing device, a server, a laptop computer, a tablet computer, a netbook computer, a personal computer (PC), or a desktop computer. In another embodiment, each of endpoint 130 and endpoint 140 can represent a computing system utilizing clustered computers and components to act as a single pool of seamless resources. In some embodiments, endpoint 130 and endpoint 140 represent computing devices within a single computing system utilizing clustered computers and components to act as a single pool of seamless resources. For example, endpoint 130 and endpoint 140 are computing devices or computing systems in a cloud-computing environment. In general, endpoint 130 can be any computing device or a combination of devices with access to and/or capable of executing traceroute program 132, audit program 134 and database 136 provided that it can access user device 110, endpoint 140, and one or more networking device(s) 150. In general, endpoint 140 can be any computing device or a combination of devices with access to traceroute program 142, audit program 144, database 146, user device 110, endpoint 130, and one or more networking device(s) 150.

Each of traceroute program 132 and traceroute program 142 operates to execute a traceroute between a first endpoint of a plurality of endpoints in communication with network 120 and a second endpoint of the plurality of endpoints in communication with network 120. For example, traceroute program 132 operates to execute a traceroute between endpoint 130 and endpoint 140, thereby capturing information about layer 3 networking devices along the path between endpoint 130 and endpoint 140. In this case, if, for example, networking device 150a and networking device 150c are two routers between endpoint 130 and endpoint 140 and networking device 150b is a switch between networking device 150a and networking device 150c, then traceroute program 132 will deliver traceroute results identifying networking device 150a and networking device 150c but not identifying networking device 150b. In another example, traceroute program 142 operates to execute a traceroute between endpoint 140 and endpoint 130, capturing information about layer 3 networking devices along the path between endpoint 140 and endpoint 130. In this case, if networking device 150c and networking device 150a are two routers between endpoint 140 and endpoint 130 and networking device 150b is a switch between networking device 150c and networking device 150a, then traceroute program 142 will deliver traceroute results identifying networking device 150c and networking device 150a but not identifying networking device 150b.

Each of audit program 134 and audit program 144 operates to perform a networking device audit of networking devices between endpoints of network 120. A networking device audits is an inventory of one or more networking devices between two endpoints, the inventory including device information of each networking device. In one embodiment, audit program 134 gathers information describing a networking device by sending (whether directly or indirectly) a packet to the networking device and receiving (whether directly or indirectly) a response from the networking device. For example, audit program 134 gathers information describing networking devices along a path from a first endpoint to a second endpoint, wherein the networking devices include those identified by the traceroute executed by traceroute program 132 and may also include additional networking devices (e.g., layer 2 switches) not identified by the traceroute. Audit program 144 operates in a similar fashion to audit program 134. However, a path taken by data sent from a first endpoint to a second endpoint may be different than a path taken by data sent from the second endpoint to the first endpoint. Accordingly, in some embodiments, audit program 134 and audit program 144 function to perform a networking device audit of networking devices along a path between two endpoints of network 120, but from opposite directions along the path. Audit program 134 and audit program 144 may store the results of the networking device audit to database 136 and database 146, respectively, or to another database (e.g., database 114).

Database 136 is a data repository that may be written to and read by traceroute program 132 and audit program 134. Resource data may be stored to database 136. In some embodiments, database 136 may be written to and read by user device 110, endpoint 140, or by programs and entities outside of computing environment 100 in order to populate the repository with resource data.

Database 146 is a data repository that may be written to and read by traceroute program 142 and audit program 144. Resource data may be stored to database 146. In some embodiments, database 146 may be written to and read by user device 110, endpoint 140, or by programs and entities outside of computing environment 100 in order to populate the repository with resource data.

Resource data includes resource discovery packet structure information (see FIG. 6), resource discovery table information (see FIG. 7), and networking device data (e.g., IP address, type of device, system serial number, system software version, system make, system model, system features supported) describing endpoint 130, endpoint 140, networking device(s) 150, or any combination thereof.

In this exemplary embodiment, traceroute program 132, audit program 134, and database 136 are stored on endpoint 130. In other embodiments, one or any combination of traceroute program 132, audit program 134, and database 136 may reside on another computing device, provided that each can access user device 110, endpoint 140, one or more networking device(s) 150, and one another. In yet other embodiments, one or any combination of traceroute program 132, audit program 134, and database 136 may be stored externally and accessed through a communication network, such as network 120.

In this exemplary embodiment, traceroute program 142, audit program 144, and database 146 are stored on endpoint 140. In other embodiments, traceroute program 142, audit program 144, and database 146 may reside on another computing device, provided that they can access user device 110, endpoint 130, one or more networking device(s) 150, and one another. In yet other embodiments, traceroute program 142, audit program 144, and database 146 may be stored externally and accessed through a communication network, such as network 120.

Networking device(s) 150 includes an arbitrary number of networking devices. For convenience of explanation, networking device(s) 150 is depicted as including three networking devices, namely networking device 150*a*, networking device 150*b*, and networking device 150*c*. It should be understood that features of the present invention may also apply to the situation in which networking device(s) 150 represents a different (whether greater or lesser) number of networking devices. Generally, networking device(s) 150 refers to one or more networking devices within computing environment 100 that are used to transmit and receive information between endpoint 130 and endpoint 140. In some embodiments, networking device(s) 150 are networking devices (e.g., routers, switches, hosts, proxies) of network 120.

In this exemplary embodiment, controller program 112 and database 114 are stored on user device 110. In other embodiments, one or both of controller program 112 and database 114 may reside on another computing device, provided that each can access endpoint 130, endpoint 140, one or more networking device(s) 150, and each other. In yet other embodiments, one or both of controller program 112 and database 114 may be stored externally and accessed through a communication network, such as network 120.

In various embodiments, user device 110 is a computing device that can be a standalone device, a server, a laptop computer, a tablet computer, a netbook computer, a personal computer (PC), a desktop computer, a personal digital assistant (PDA), a smart phone, or any programmable electronic device capable of communicating with endpoint 130, endpoint 140, and networking device(s) 150 via network 120. In another embodiment, user device 110 represents a computing system utilizing clustered computers and components to act as a single pool of seamless resources. In general, user device 110 can be any computing device or a combination of devices with access to endpoint 130, endpoint 140, and networking device(s) 150, and with access to and/or capable of executing some or all of traceroute program 132, audit program 134, and database 136. In some embodiments, user device 110 includes a user interface (UI) by which a user provides user input to user device 110. User device 110 can communicate such user input, via network 120, to either or both of endpoint 130 and endpoint 140. User device 110 may include internal and external hardware components, as depicted and described in further detail with respect to FIG. 8.

Controller program 112 operates to request and receive audit data about networking devices along a data path between two specified endpoints through network 120 within computing environment 100. For example, controller program 112 operates to request and receive audit data about networking device(s) 150 that are between endpoint 130 and endpoint 140, and controller program 112 stores the received audit data in database 114. In some embodiments, controller program 112 presents the audit data to a user and, in response, receives user input identifying one or more networking device(s) 150. Based on the user input, controller program 112 excludes the identified one or more networking device(s) 150 from the data path such that future data sent between endpoint 130 and endpoint 140 does not travel through the excluded networking device(s) 150.

Database 114 is a data repository that may be written to and read by controller program 112. Audit data may be stored to database 114. In some embodiments, database 114 may be written to and read by endpoint 130, endpoint 140, or by programs and entities outside of computing environment 100 in order to populate the repository with audit data.

Audit data includes networking device data, which is information that describes one or more networking devices along a path of communication via network 120 between two endpoints (e.g., endpoint 130 and endpoint 140). In one embodiment, audit data includes networking device data describing the endpoints at either end of the path of communication. Controller program 112 may receive audit data in response to an audit being completed.

Figure 2:
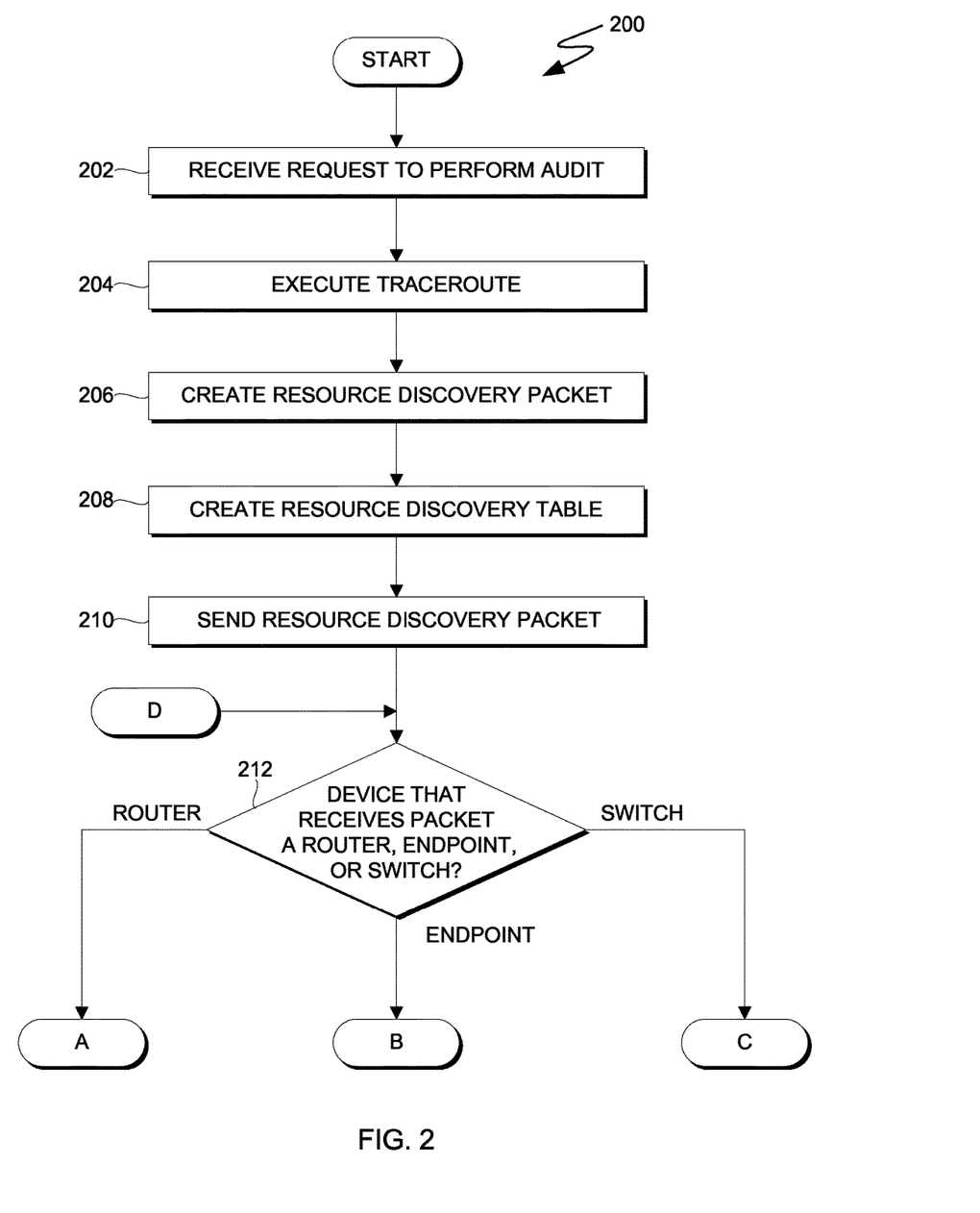
FIG. 2 is a flowchart depicting operations for auditing networking devices, on a computing device within the computing environment of FIG. 1, in accordance with an embodiment of the present disclosure.

FIG. 2 is a flowchart depicting operations for auditing networking devices within the computing environment of FIG. 1, in accordance with an embodiment of the present disclosure. For example, FIG. 2 is a flowchart depicting operations 200 of audit program 134 for auditing networking devices between two endpoints within computing environment 100. However, operations 200 can also be performed by audit program 144. In one example, controller program 112 may instruct audit program 134 to audit the networking devices along a path through network 120 from endpoint 130 and endpoint 140 and may further instruct audit program 144 to audit the networking devices along a path from endpoint 140 to endpoint 130. In this case, both audit program 134 and audit program 144 generate a networking device audit, but from opposite perspectives with respect to the path through network 120 between the endpoints. For convenience of explanation, operations 200 are described from the perspective of endpoint 130 performing an audit of the networking devices along a path through network 120 to endpoint 140.

In operation 202, audit program 134 receives a request to perform an audit. For example, audit program 134 receives a request to perform an audit on all networking devices on the data travel path between endpoint 130 and endpoint 140, inclusive of one or both of endpoint 130 and endpoint 140. In one embodiment, the request to perform an audit is in the form of a request to initiate a traceroute received from controller program 112. Responsive to receiving the request, audit program 134 determines that, in order to perform the audit, the IP addresses of the networking devices along the data path between endpoint 130 and endpoint 140 must be identified.

In operation 204, traceroute program 132 executes a traceroute. For example, traceroute program 132 executes a traceroute from endpoint 130 to endpoint 140, identifying networking device(s) that lie along the path between the two endpoints. In one example, networking device 150a and networking device 150c are routers that lie on the data travel path between endpoint 130 and endpoint 140. In this example, traceroute program 132 identifies IP addresses associated with networking devices 150a and 150c, and traceroute program 132 stores the IP address information in database 136. In another example, traceroute program 132 provides the IP address information to audit program 134 in lieu of, or in addition to, storing the IP address information in database 136.

In operation 206, audit program 134 creates a resource discovery packet. In various embodiments, the resource discovery packet is a packet that defines the structure of information that will be gathered for the audit, the path through which the request will be sent in order to capture data about each networking device along the path between two specified endpoints, the data requested from each networking device, the format in which the networking device will provide the data, or a combination thereof. For example, using the example from operation 204, audit program 134 creates a resource discovery packet to request and receive details about networking device 150a, networking device 150b, networking device 150c, and endpoint 140. In this example, audit program 134 uses traceroute results stored in database 136 to identify that there are three hops between endpoint 130 and endpoint 140 (i.e., endpoint 130 to networking device 150a, networking device 150a to networking device 150c, and networking device 150c to endpoint 140). Audit program 134 defines the type and format of data required from each networking device, what fields within the resource discovery packet each type of networking device is permitted to update, and the fields that define where each networking device should send a reply and forward a request, which is discussed further in connection with FIG. 6.

Figure 7:
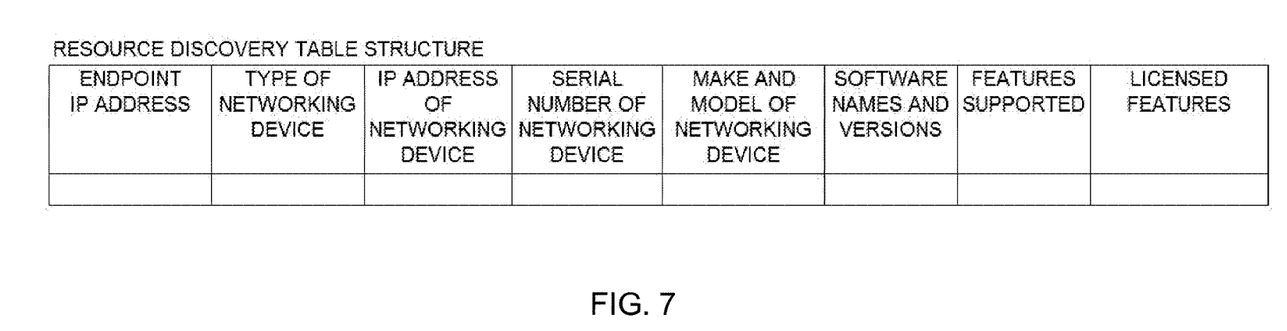
FIG. 7 illustrates an example resource discovery table format, in accordance with an embodiment of the present disclosure.

In operation 208, audit program 134 creates a resource discovery table. The resource discovery table is a compilation, in tabular form, of information about all networking devices along the traceroute path, between, and including, a first endpoint and a second endpoint within computing environment 100. Audit program 134 inserts the IP address of endpoint 130 into the resource discovery table. In one embodiment, the resource discovery table structure is as illustrated in FIG. 7.

In operation 210, audit program 134 sends the resource discovery packet. Continuing the same example as in prior operations, audit program 134 sends the resource discovery packet to networking device 150a, which is a router. The fields within the resource discovery packet include: a reserved multicast MAC address in the "destination MAC address" field, wherein the reserved multicast MAC address is a predetermined value used to identify that the packet is a resource discovery packet; the MAC address of endpoint 130 in the "source MAC address" field; a predefined EtherType value for this function in the "EtherType" field; a label (e.g., the word "request") in the "type of packet" field; the IP addresses of endpoint 130, networking device 150a, networking device 150c, and endpoint 140 in the "underlay hop information TLV" field; the MAC address of endpoint 130 in the "target MAC address" field; the MAC address of the next hop (e.g., the MAC address of networking device 150a in the "next hop's MAC address" field; and no value in the "resource information type-length-value (TLV)" field. In one embodiment, the predefined EtherType value for a resource discovery packet is "0x8673".

In decision 212, a determination is made as to whether the device that received the packet is a router, an endpoint, or a switch. In one embodiment, this decision is made subsequent to audit program 134 sending a first one of a plurality of resource discovery packets from endpoint 130 to a first one of networking device(s) 150. In various embodiments, this decision is made subsequent to a first one of networking device(s) 150 receiving a resource discovery packet from a second one of networking device(s) 150. If the device that receives the packet is a router (decision 212, ROUTER branch), then audit program 134 moves to decision 302. If the device that receives the packet is an endpoint (decision 212, ENDPOINT branch), then audit program 134 moves to decision 402. If the device that receives the packet is a switch (decision 212, SWITCH branch), then audit program 134 moves to decision 502.

Figure 3:
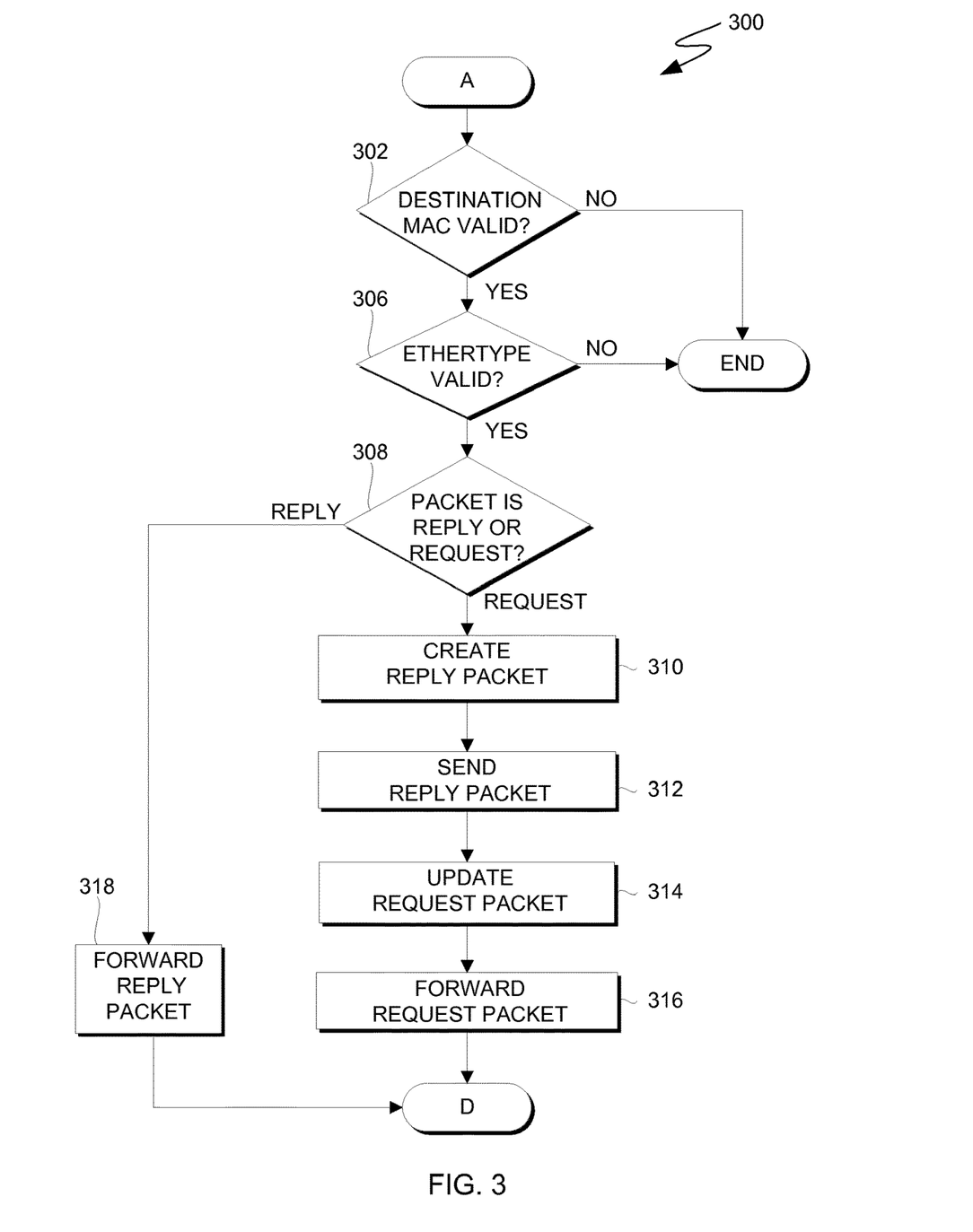
FIG. 3 is a flowchart depicting operations for auditing networking devices, on a computing device within the computing environment of FIG. 1, in accordance with an embodiment of the present disclosure.

FIG. 3 is a flowchart depicting operations for auditing networking devices within the computing environment of FIG. 1, in accordance with an embodiment of the present disclosure. For example, FIG. 3 is a flowchart depicting operations 300 of performing an audit on networking devices between two endpoints within computing environment 100.

In decision 302, the destination MAC address is validated. For example, a router (i.e., one of networking device(s) 150) compares the value in the destination MAC address field of the resource discovery packet to its own MAC address. If there is not a match (decision 302, NO branch), then operations 300 end. If there is a match (decision 302, YES branch), then the EtherType is validated (decision 306).

In decision 306, the EtherType is validated. For example, the router compares the value in the EtherType field of the resource discovery packet to a predefined expected EtherType value (e.g., 0x8673), which signifies that the packet is a resource discovery packet and that appropriate action is required. If there is not a match (decision 306, NO branch), then operations 300 end. If there is a match (decision 306, YES branch), then the router determines whether the resource discovery packet is a reply or a request (decision 308).

In decision 308, the packet is determined to be a reply or a request. For example, if the value in the type of packet field of the resource discovery packet is "reply", then the router determines that the resource discovery packet is a reply (decision 308, REPLY branch), and the router forwards the reply packet (operation 318). In a further example, if the value in the type of packet field of the resource discovery packet is "request", then the router determines that the resource discovery packet is a request (decision 308, REQUEST branch), and the router creates a reply packet (operation 310).

In operation 310, the router creates a reply packet. The router updates fields in the resource discovery packet to create a resource reply packet. The router updates the resource information TLV field with its own resource information. The router replaces the value in the destination MAC address field with the value in the target MAC address field. The router changes the value in the type of packet field from "request" to "reply". The router updates the target MAC address field with the value in the source MAC address field and replaces the value in the source MAC address field with its own MAC address.

In operation 312, the router sends a reply packet. Responsive to creating the reply packet in operation 310, the router sends the reply packet to the first IP address as indicated in the underlay hop information TLV field.

In operation 314, the router updates the request packet. The router updates fields in the resource discovery packet to prepare the packet for forwarding to the next networking device along the predefined path. In one embodiment, the router deletes its own IP address from the underlay hop information TLV field and the router updates the target MAC address field with its own MAC address.

In operation 316, the router forwards the request packet. In this operation, the router forwards the newly updated resource discovery packet that it created in operation 310 to the second IP address indicated in the underlay hop information TLV field.

In operation 318, the router forwards the reply packet. The router forwards the resource reply packet, without making any updates, to the first IP address identified in the underlay hop information TLV field.

Figure 4:
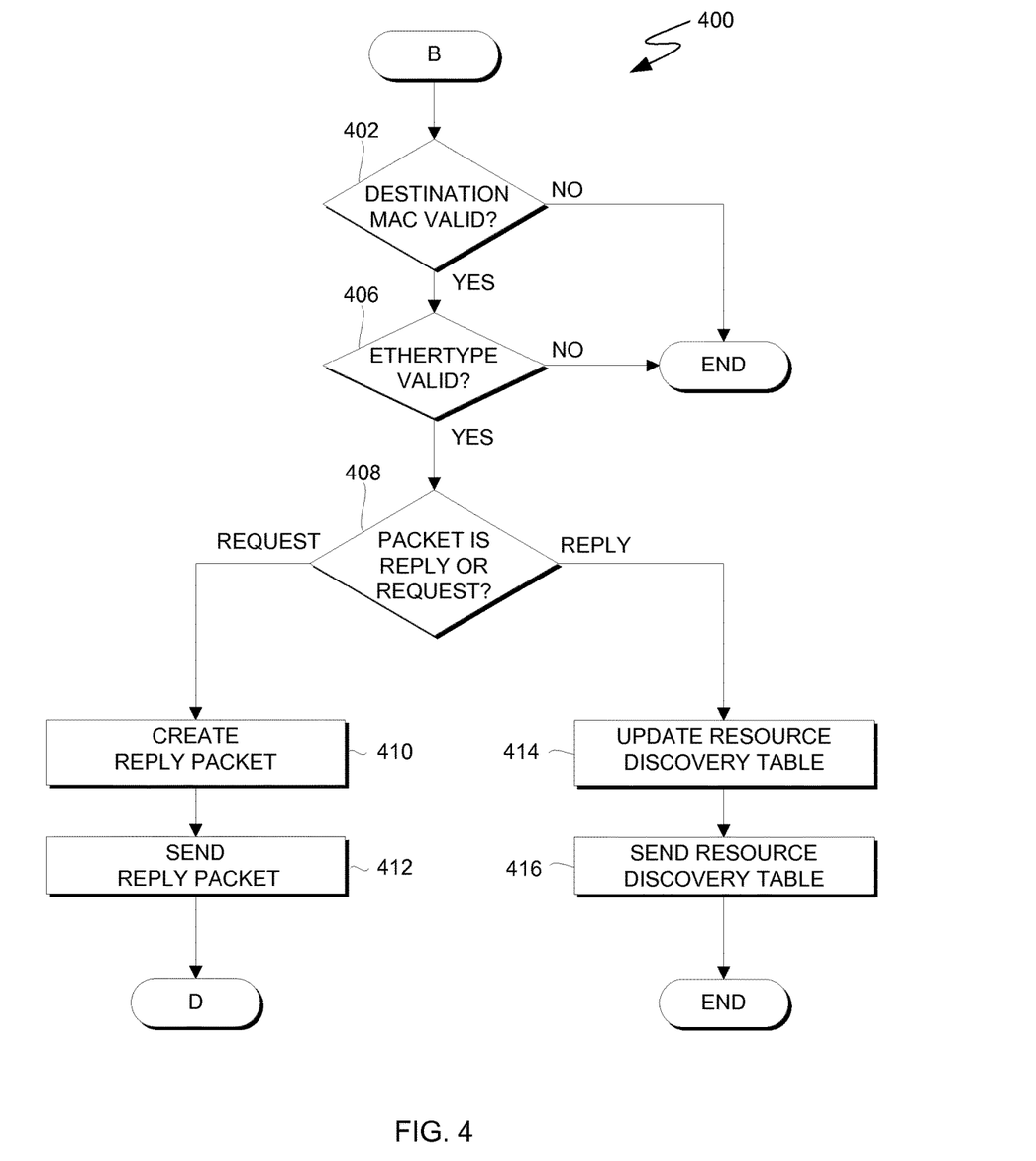
FIG. 4 is a flowchart depicting operations for auditing networking devices, on a computing device within the computing environment of FIG. 1, in accordance with an embodiment of the present disclosure.

FIG. 4 is a flowchart depicting operations for auditing networking devices, on a computing device within the computing environment of FIG. 1, in accordance with an embodiment of the present disclosure. For example, FIG. 4 is a flowchart depicting operations 400 of performing an audit on networking devices between two endpoints within computing environment 100.

In decision 402, the destination MAC address is validated. For example, the endpoint compares the value in the destination MAC address field of the resource discovery packet to its own MAC address. If there is not a match (decision 402, NO branch), then operations 400 end. If there is a match (decision 402, YES branch), then the EtherType is validated (decision 406).

In decision 406, the EtherType is validated. For example, the endpoint compares the value in the EtherType field of the resource discovery packet to a predefined expected EtherType value (e.g., 0x8673), which signifies that the packet is a resource discovery packet and that appropriate action is required. If there is not a match (decision 406, NO branch), then operations 400 end. If there is a match (decision 406, YES branch), then the endpoint determines whether the resource discovery packet is a reply or a request (decision 408).

In decision 408, the packet is determined to be a reply or a request. For example, if the value in the type of packet field of the resource discovery packet is "reply", then the endpoint determines that the resource discovery packet is a reply (decision 408, REPLY branch), and the endpoint updates the resource discovery table (operation 414). In a further example, if the value in the type of packet field of the resource discovery packet is "request", then the endpoint determines that the resource discovery packet is a request (decision 408, REQUEST branch), and the endpoint creates a reply packet (operation 410).

In operation 410, the endpoint creates a reply packet. The endpoint updates fields in the resource discovery packet to create a resource reply packet. The endpoint updates the resource information TLV field with its own resource information. The endpoint replaces the value in the destination MAC address field with the value in the target MAC address field. The endpoint changes the value in the type of packet field from request to reply. The endpoint updates the target MAC address field with the value in the source MAC address field and replaces the value in the source MAC address field with its own MAC address.

In operation 412, the endpoint sends a reply packet. Responsive to creating the reply packet in operation 410, the endpoint sends the reply packet to the first IP address as indicated in the underlay hop information TLV field.

In operation 414, the endpoint (e.g., via audit program 134) updates the resource discovery table. As mentioned earlier, this description is from the perspective of endpoint 130 for the sake of convenience of explanation, so endpoint 130 receives reply packets from the networking devices along the path through network 120 to endpoint 140. Accordingly, endpoint 130 updates the resource discovery table. For example, responsive to receiving a reply from one or networking device(s) 150, audit program 134 updates the resource discovery table. Audit program 134 updates the resource discovery table (created in operation 208) by parsing the reply packet and updating fields in the resource discovery table based on values in the fields within the reply packet. Audit program 134 performs this step for each reply packet received from each of networking device(s) 150 along the data path between endpoint 130 and endpoint 140. Audit program 134 proceeds to operation 416 in response to determining that a reply has been received from each networking device along the path from endpoint 130 to endpoint 140. In one example, audit program 134 determines that all replies have been received based on audit program 134 receiving a reply from each networking device identified by the traceroute. In another example, audit program 134 determines that all replies have been received based on audit program 134 receiving a reply from endpoint 140. In some embodiments, audit program 134 determines that all replies have been received based on audit program 134 receiving a reply from endpoint 140 and determining that a predetermined time period has elapsed.

In operation 416, an endpoint sends the resource discovery table to a device from which it received a request to perform an audit. Audit program 134 sends the completed resource discovery table to controller program 112. In one embodiment, controller program 112 receives two resource discovery tables, one created by and sent from audit program 134, and one created by and sent from audit program 144.

Figure 5:
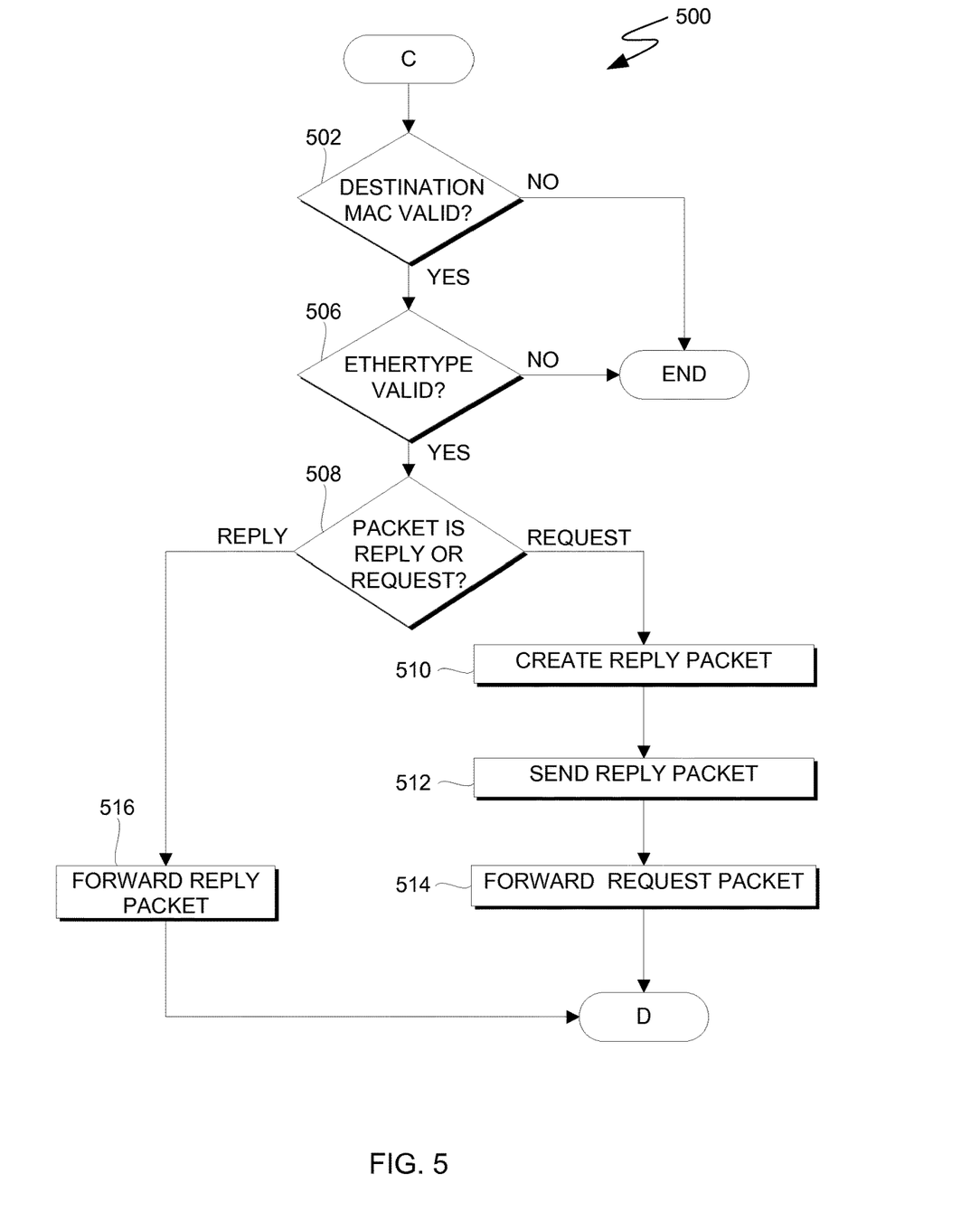
FIG. 5 is a flowchart depicting operations for auditing networking devices, on a computing device within the computing environment of FIG. 1, in accordance with an embodiment of the present disclosure.

FIG. 5 is a flowchart depicting operations for auditing networking devices, on a computing device within the computing environment of FIG. 1, in accordance with an embodiment of the present disclosure. For example, FIG. 5 is a flowchart depicting operations 500 of performing an audit on networking devices between two endpoints within computing environment 100.

In decision 502, the destination MAC address is validated. For example, a switch compares the value in the destination MAC address field of the resource discovery packet to its own MAC address. If there is not a match (decision 502, NO branch), then operations 500 end. If there is a match (decision 502, YES branch), then the EtherType is validated (decision 506).

In decision 506, the EtherType is validated. For example, the switch compares the value in the EtherType field of the resource discovery packet to a predefined expected EtherType value (e.g., 0x8675), which signifies that the packet is a resource discovery packet and that appropriate action is required. If there is not a match (decision 506, NO branch), then operations 500 end. If there is a match (decision 506, YES branch), then the switch determines whether the resource discovery packet is a reply or a request (decision 508).

In decision 508, the packet is determined to be a reply or a request. For example, if the value in the type of packet field of the resource discovery packet is "reply", then the switch determines that the resource discovery packet is a reply (decision 508, REPLY branch), and the switch forwards the reply packet (operation 516). In a further example, if the value in the type of packet field of the resource discovery packet is "request", then the switch determines that the resource discovery packet is a request (decision 508, REQUEST branch), and the switch creates a reply packet (operation 510).

In operation 510, the switch creates a reply packet. The switch updates fields in the resource discovery packet to create a resource reply packet. The switch updates the resource information TLV field with its own resource information. The switch replaces the value in the destination MAC address field with the value in the target MAC address field. The switch changes the value in the type of packet field from request to reply. The switch updates the target MAC address field with the value in the source MAC address field and replaces the value in the source MAC address field with its own MAC address.

In operation 512, the switch sends a reply packet. Responsive to creating the reply packet in operation 510, the switch sends the reply packet to the first IP address as indicated in the underlay hop information TLV field.

In operation 514, forwards the request packet. In this operation, the switch updates the source MAC address field with its own MAC address, and, with no other updates, forwards the resource discovery packet to the MAC address as indicated in the next hop's MAC address field.

In operation 516, the switch forwards the reply packet. The switch forwards the resource reply packet, without making any updates, to the first IP address identified in the underlay hop information TLV field.

Figure 6:
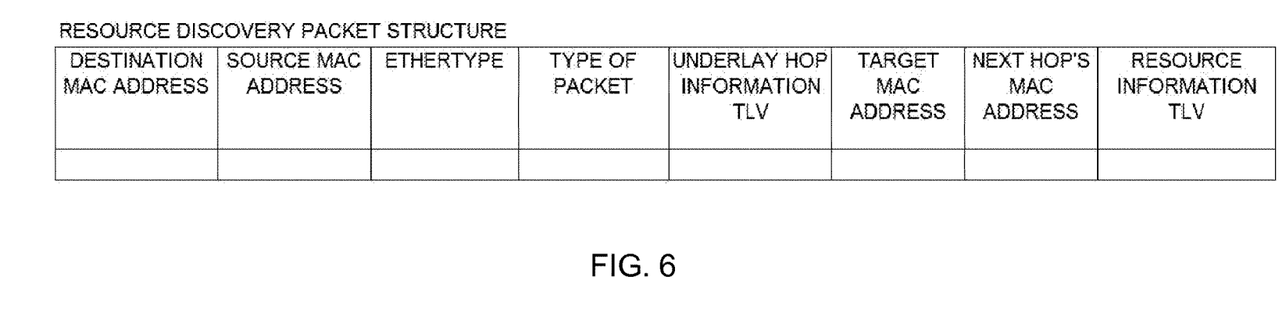
FIG. 6 illustrates an example resource discovery packet format, in accordance with an embodiment of the present disclosure.

FIG. 6 illustrates a resource discovery packet for auditing networking devices, on a computing device within the computing environment of FIG. 1, in accordance with an embodiment of the present disclosure.

The destination MAC address is a reserved multicast MAC address. The source MAC address is a MAC address of the sending networking device. The EtherType is the applicable EtherType of the function being performed. In one embodiment, the EtherType is "0x8673". The type of packet is either request or reply. The underlay hop information TLV contains hop information (e.g., the IP address of a source endpoint, the IP address of a destination endpoint, and the IP addresses of each router along the path between the source and destination endpoints.) The target MAC address is the MAC address of the next router or host to which a networking device sends a packet. For example, the first resource discovery packet that audit program 134 generates will contain the MAC address for endpoint 130 in this field. As the resource discovery packet is forwarded along the data path, each router updates this field with its own MAC address, and each switch makes no updates to this field. The next hop's MAC address field contains the MAC address to which networking devices forward the resource discovery packet, responsive to matching the value in this field to the value of the same field in its own forwarding table. The resource information TLV is a field that each networking device updates with its own resource information when creating a reply packet, as previously described in operations 310, 410, and 510. Resource information of a networking device may include one or more of: type of networking device, IP address of the networking device, serial number of the network device, make and model of the network device, software names and versions, features supported, and licensed features, which are discussed further in connection with FIG. 7. In one example, resource information is stored as a comma-delineated list in the resource information TLV field.

FIG. 7 illustrates a resource discovery table for auditing networking devices, on a computing device within the computing environment of FIG. 1, in accordance with an embodiment of the present disclosure.

In one embodiment, audit program 134 uses a resource discovery table structure as illustrated in FIG. 7, both when creating a resource discovery table and when updating the resource discovery table (operation 414) responsive to receiving a reply packet. The resource discovery table includes one column for each type of information that is compiled (if available and received by audit program 134) about each networking device. The column names are: endpoint IP address (i.e., the address of the endpoint from which the resource discovery packet was initiated); type of networking device (e.g., router, switch, host, proxy); IP address of networking device; serial number of networking; make and model of networking; software names (e.g., "Software A") and versions (e.g., "1.2" or "Software A 1.2"); features supported (e.g., hardware and/or software features supported by the networking device); and licensed features (i.e., software features or other features licensed for use within or by the networking device). In various embodiments, software names and versions of a networking device include one or more names and corresponding versions of firmware, drivers, and software residing on the networking device. For each networking device along the data path between the first endpoint and the second endpoint, there is a row of information in the resource discovery table. The value in the first field in each row of the resource discovery table is the IP address of the endpoint that initiated the resource discovery request to which the networking device responded; the values in the remaining fields in each row correspond to one networking device. In some embodiments, all fields in all rows are populated. In various embodiments, one or more fields in one or more rows are unpopulated.

Figure 8:
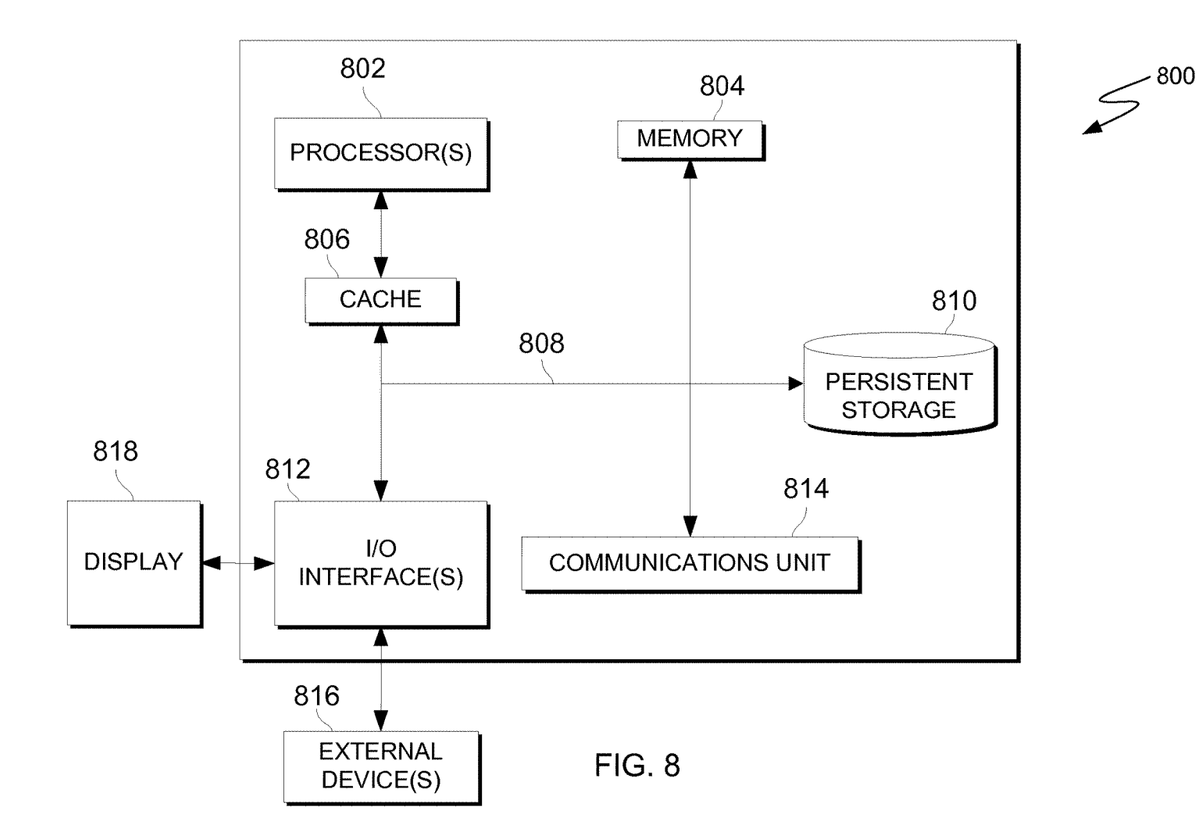
FIG. 8 is a block diagram of components of a computing device executing operations for auditing networking devices, in accordance with an embodiment of the present disclosure.

FIG. 8 is a block diagram of components of a computing device, generally designated 800, in accordance with an embodiment of the present invention. In one embodiment, computing system 800 is representative of user device 110 within computing environment 100, in which case user device 110 includes controller program 112 and database 114. In one embodiment, computing system 800 is representative of endpoint 130 within computing environment 100, in which case endpoint 130 includes traceroute program 132, audit program 134, and database 136. In one embodiment, computing system 800 is representative of endpoint 140 within computing environment 100, in which endpoint 140 includes traceroute program 142, audit program 144, and database 146.

It should be appreciated that FIG. 8 provides only an illustration of one implementation and does not imply any limitations with regard to the environments in which different embodiments may be implemented. Many modifications to the depicted environment may be made.

Computing system 800 includes processor(s) 802, cache 806, memory 804, persistent storage 810, input/output (I/O)

interface(s) 812, communications unit 814, and communications fabric 808. Communications fabric 808 provides communications between cache 806, memory 804, persistent storage 810, communications unit 814, and input/output (I/O) interface(s) 812. Communications fabric 808 can be implemented with any architecture designed for passing data and/or control information between processors (such as microprocessors, communications and network processors, etc.), system memory, peripheral devices, and any other hardware components within a system. For example, communications fabric 808 can be implemented with one or more buses or a crossbar switch.

Memory 804 and persistent storage 810 are computer readable storage media. In this embodiment, memory 804 includes random access memory (RAM). In general, memory 804 can include any suitable volatile or non-volatile computer readable storage media. Cache 806 is a fast memory that enhances the performance of processor(s) 802 by holding recently accessed data, and data near recently accessed data, from memory 804.

Program instructions and data used to practice embodiments of the present invention may be stored in persistent storage 810 and in memory 804 for execution by one or more of the respective processor(s) 802 via cache 806. In an embodiment, persistent storage 810 includes a magnetic hard disk drive. Alternatively, or in addition to a magnetic hard disk drive, persistent storage 810 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 810 may also be removable. For example, a removable hard drive may be used for persistent storage 810. Other examples include optical and magnetic disks, thumb drives, and smart cards that are inserted into a drive for transfer onto another computer readable storage medium that is also part of persistent storage 810.

Communications unit 814, in these examples, provides for communications with other data processing systems or devices. In these examples, communications unit 814 includes one or more network interface cards. Communications unit 814 may provide communications through the use of either or both physical and wireless communications links. Program instructions and data used to practice embodiments of the present invention may be downloaded to persistent storage 810 through communications unit 814.

I/O interface(s) 812 allows for input and output of data with other devices that may be connected to each computer system. For example, I/O interface(s) 812 may provide a connection to external device(s) 816 such as a keyboard, keypad, a touch screen, and/or some other suitable input device. External device(s) 816 can also include portable computer readable storage media such as, for example, thumb drives, portable optical or magnetic disks, and memory cards. Software and data used to practice embodiments of the present invention can be stored on such portable computer readable storage media and can be loaded onto persistent storage 810 via I/O interface(s) 812. I/O interface(s) 812 also connect to display 818.

Display 818 provides a mechanism to display or present data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving, by one or more processors, a request to identify at least one networking device along a data path from a first computing device to a second computing device from a plurality of networking devices;

initiating, by one or more processors, a first traceroute from the first computing device to the second computing device, wherein the first traceroute identifies the at least one networking device along the data path from the first computing device to the second computing device;

causing, by one or more processors, the first computing device to send a first resource discovery packet to the second computing device, wherein the first resource discovery packet includes a value matching a reserved multicast MAC address;

compiling, by one or more processors, information describing one or more networking devices based, at least in part, on replies generated by one or more networking devices that received a resource discovery packet;

initiating, by one or more processors, a second traceroute from the second computing device to the first computing device, wherein the second traceroute identifies at least one networking device along a data path from the second computing device to the first computing device;

causing, by one or more computer processors, the second computing device to send a second resource discovery packet to the first computing device, wherein the second resource discovery packet includes a value matching the reserved multicast MAC address;

determining, by one or more processors, if one or more network devices are qualified for use based at least in part on the compiled information from the first traceroute;

determining, by one or more processors, if one or more network devices are qualified for use based at least in part on the compiled information from the second traceroute;

determining, by one or more computer processors, that the path from the first computing device to the second computing device is different that the path from the second computing device to the first computing device based on the compiled information; and in response to determining that a networking device in the path from the second computing device to the first computing device is not qualified for use based at least in part on the compiled information, but all networking devices in the path from the first computing device to the second computing device are qualified, excluding, by one or more processors, the networking device on the path from the second computing device to the first computing device from the one or more network devices based on the determination.

2. The method of claim 1, wherein compiling the information describing one or more networking devices is further based, at least in part, on replies generated by one or more networking devices that received the second resource discovery packet.

3. The method of claim 2, wherein each resource discovery packet includes fields for at least: a destination MAC address, a source MAC address, an EtherType, a type of packet, underlay hop information TLV, a target MAC address, a next hop's MAC address, and resource information TLV.

4. The method of claim 2, wherein the information describing one or more networking devices describes a networking device not identified by either the first traceroute or the second traceroute.

5. The method of claim 2, wherein compiling the information is responsive to determining that a reply has been received from each networking device identified by at least one of the first traceroute and the second traceroute.

6. The method of claim 2, wherein the information includes, for a particular networking device: a type, an IP address, one or more software versions associated with one or more software names, a serial number, a make and model, one or more features supported, and one or more licensed features.

7. A computer program product comprising:
a computer readable storage medium and program instructions stored on the computer readable storage medium, the program instructions comprising:
program instructions to receive a request to identify at least one networking device along a data path from a first computing device to a second computing device from a plurality of networking devices;
program instructions to initiate a first traceroute from the first computing device to the second computing device, wherein the first traceroute identifies the at least one networking device along the data path from the first computing device to the second computing device;
program instructions to cause the first computing device to send a first resource discovery packet to the second computing device, wherein the first resource discovery packet includes a value matching a reserved multicast MAC address;
program instructions to compile information describing one or more networking devices based, at least in part, on replies generated by one or more networking devices that received a resource discovery packet;
program instructions to initiate a second traceroute from the second computing device to the first computing device, wherein the second traceroute identifies at least one networking device along a data path from the second computing device to the first computing device;
program instructions to cause the second computing device to send a second resource discovery packet to the first computing device, wherein the second resource discovery packet includes a value matching the reserved multicast MAC address;
program instructions to determine if one or more network devices are qualified for use based at least in part on the compiled information from the first traceroute;
program instructions to determine if one or more network devices are qualified for use based at least in part on the compiled information from the second traceroute;
program instructions to determine that the path from the first computing device to the second computing device is different that the path from the second computing device to the first computing device based on the compiled information; and
program instructions to, in response to determining that a networking device in the path from the second computing device to the first computing device is not qualified for use based at least in part on the compiled information, but all networking devices in the path from the first computing device to the second computing device are qualified, program instructions to the networking device on the path from the second computing device to the first computing device from the one or more network devices based on the determination.

8. The computer program product of claim 7, wherein the program instructions to compile the information describing one or more networking devices is further based, at least in part, on replies generated by one or more networking devices that received the second resource discovery packet.

9. The computer program product of claim 8, wherein each resource discovery packet includes fields for at least: a destination MAC address, a source MAC address, an EtherType, a type of packet, underlay hop information TLV, a target MAC address, a next hop's MAC address, and resource information TLV.

10. The computer program product of claim 8, wherein the information describing one or more networking devices describes a networking device not identified by either the first traceroute or the second traceroute.

11. The computer program product of claim 8, wherein compiling the information is responsive to determining that a reply has been received from each networking device identified by at least one of the first traceroute and the second traceroute.

12. The computer program product of claim 8, wherein the information includes, for a particular networking device: a type, an IP address, one or more software versions associated with one or more software names, a serial number, a make and model, one or more features supported, and one or more licensed features.

13. A computer system comprising: one or more computer processors; one or more computer readable storage media;
program instructions stored on the computer readable storage media for execution by at least one of the one or more processors, the program instructions comprising:
program instructions to receive a request to identify at least one networking device along a data path from a first computing device to a second computing device from a plurality of networking devices;
program instructions to initiate a first traceroute from the first computing device to the second computing device, wherein the first traceroute identifies the at least one networking device along the data path from the first computing device to the second computing device;
program instructions to cause the first computing device to send a first resource discovery packet to the second computing device, wherein the first resource discovery packet includes a value matching a reserved multicast MAC address;
program instructions to compile information describing one or more networking devices based, at least in part, on replies generated by one or more networking devices that received a resource discovery packet;
program instructions to initiate a second traceroute from the second computing device to the first computing device, wherein the second traceroute identifies at least one networking device along a data path from the second computing device to the first computing device;

program instructions to cause the second computing device to send a second resource discovery packet to the first computing device, wherein the second resource discovery packet includes a value matching the reserved multicast MAC address;

program instructions to determine if one or more network devices are qualified for use based at least in part on the compiled information from the first traceroute;

program instructions to determine if one or more network devices are qualified for use based at least in part on the compiled information from the second traceroute;

program instructions to determine that the path from the first computing device to the second computing device is different that the path from the second computing device to the first computing device based on the compiled information; and program instructions to, in response to determining that a networking device in the path from the second computing device to the first computing device is not qualified for use based at least in part on the compiled information, but all networking devices in the path from the first computing device to the second computing device are qualified, program instructions to the networking device on the path from the second computing device to the first computing device from the one or more network devices based on the determination.

14. The computer system of claim 13, wherein the program instructions to compile the information describing one or more networking devices is further based, at least in part, on replies generated by one or more networking devices that received the second resource discovery packet.

15. The computer system of claim 14, wherein each resource discovery packet includes fields for at least: a destination MAC address, a source MAC address, an EtherType, a type of packet, underlay hop information TLV, a target MAC address, a next hop's MAC address, and resource information TLV.

16. The computer system of claim 14, wherein the information describes one or more networking devices including a networking device not identified by either the first traceroute or the second traceroute.

17. The computer system of claim 14, wherein compiling the information is responsive to determining that a reply has been received from each networking device identified by at least one of the first traceroute and the second traceroute.

* * * * *